April 7, 1942.  J. L. CREVELING  2,278,770
ELECTRIC REGULATION
Filed May 6, 1938
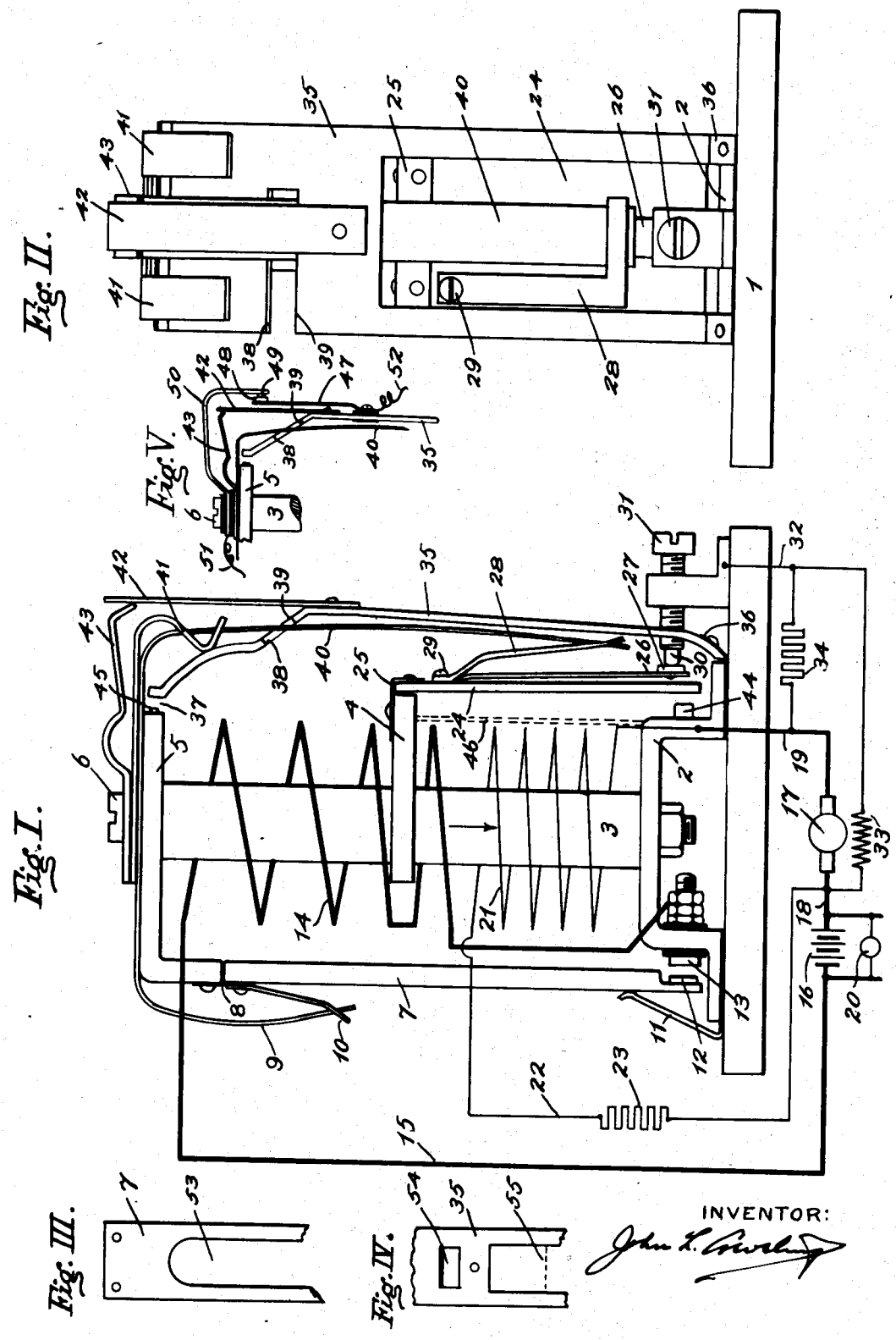
INVENTOR:
John L. Creveling Patented Apr. 7, 1942

2,278,770

UNITED STATES PATENT OFFICE 2,278,770

ELECTRIC REGULATION

John L. Creveling, near Tucson, Ariz.

Application May 6, 1938, Serial No. 206,463

16 Claims. (Cl. 171—314)

My invention pertains to that class of electric regulation wherein a dynamo or generator is to be regulated automatically in a predetermined manner throughout a wide variety of changeable conditions, and also comprehends means whereby it will be automatically connected with and disconnected from its work under certain predetermined conditions.

As my invention is particularly applicable to an electric system wherein a dynamo driven intermittently and at widely varying speeds is employed to charge a storage battery and operate lamps or other translating devices which are supplied by the battery when the generator speed and consequent voltage are below the values necessary to supply current to the load, it will be described with respect to such a system.

Obviously, such systems are useful especially in lighting and air-conditioning railway cars by means of current derived from a generator driven from a car axle, and in supplying current to the many electrical devices upon a modern automobile by means of a generator driven from the engine or motor thereof.

In this country it has become, for many years, almost universal practice, in such systems employed upon railway cars, to use an automatic switch or so-called reverse current relay to connect the generator and battery when their voltages are substantially equal so that the generator can then supply current to the system, and to disconnect the generator from the battery when the generator voltage falls very slightly below that of the battery so as to prevent back discharge from the battery through the generator, and automatically to control the generator substantially independently with respect to current and voltage limits in the manner set forth and covered in my Patent No. 1,251,479, of Jan. 1, 1918, and particularly as illustrated in Fig. II thereof. Such regulators together with a separate automatic switch are relatively expensive, and my present invention has for one of its objects the combining of the switch and regulator into a unitary structure so that the same coils will operate both devices without the loss of the substantially independent current and voltage regulating features. With such regulators, even if the battery voltage be below normal, as when quite discharged, the generator cannot be overloaded and the storage battery is charged at substantially full generator output until approaching a charged state when its voltage rises as the charge proceeds and causes the charging current to fall off and approach a very small value or even zero. However, if the current and voltage regulating features are entirely independent, so that the maximum voltage delivered by the generator remains absolutely constant after this value causes the current to begin to taper off, this fall in current is very gradual although it is now desirable to terminate the charge.

It is a further object of my invention to provide a regulator which may be caused so to vary the standard of the voltage regulation that, when the voltage of the battery rises and causes the current to fall off, the voltage standard will be automatically lowered slightly so as to hasten the termination of the charge.

Another object of my invention is to provide a regulator which may be arranged to cause the voltage standard to increase very slightly with the load until the maximum desired current is reached, so as to compensate for line drop if desired.

Another object of my invention is to so combine the switch and regulator that the entire device can be made so small and cheaply that it can be used upon automobiles where the present day refinements require the advantages which flow from the substantially independent current and voltage regulation. And, as this is the most important field at the present time, my invention will here be described with particular reference to such an embodiment.

In the drawing,

Fig. I is a side elevation and diagrammatic representation of one type of structure comprehending my invention.

Fig. II is an end elevation of the structure shown in Fig. I, omitting the diagrammatic portion thereof.

Fig. III is a fragmentary view of the part 7 of Fig. I.

Fig. IV is a fragmentary view of the part 35 of Figs. I and II, indicating modifications that may be made therein.

Fig. V is a fragmentary view illustrating a modification that may be made in the structure of Figs. I and II.

Referring particularly to Figs. I and II, 1 represents a base of insulating material upon which is mounted a member 2, of iron or other magnetic material, serving as a pole piece for the iron core 3, having the approximately central pole piece 4 and the upper pole piece 5 held in position as by screw 6. The pole piece 5 carries at one end thereof the armature 7, of iron or other magnetic material, which is attached thereto as by means of a flexible strip 8. The leaf spring 9 which passes through a slot in the member 10 tends to swing the armature 7 toward the left against its stop 11. Armature 7 is provided at its lower end with a contact "point" 12, preferably of silver, adapted to arrest motion of the armature toward the right by striking the contact "point" 13, carried by the member 2 and insulated therefrom as indicated. 13 is electrically connected with the series or current winding 14 surrounding a portion of the core 3 and having part of its turns below the pole piece 4 and part of its turns between the upper side of the pole piece 4 and the lower side of the pole piece 5, as will hereinafter be more fully pointed out. The upper end of winding 14 is connected as by wire 15 with one terminal of the storage battery 16, which has its other terminal connected with one brush of the generator 17 as by wire 18. The opposite brush of the generator is connected with the member 2 as by wire 19. 20 represents the load which may consist of lamps or other devices which may be connected across the battery, as indicated.

The lower portion of core 3 is surrounded by the shunt or voltage coil 21 having one end connected with member 2, and thus with one brush of the generator, and the opposite end connected with the opposite brush as by wire 22 which may have the resistor 23 inserted therein, if desired, as will be later pointed out. The pole piece 4 carries the armature 24 as by means of the flexible strip 25, and armature 24 is provided with a relatively light spring or reed 26 having at its lower end the contact "point" 27.

The L-shaped member 28 is attached to the armature 24 as by screw 29; and the leaf spring 40, by engaging the horizontal leg of the member 28, tends to draw the lower end of the armature 24 toward the right and hold 27 in contact with the "point" 30, adjustable as by screw 31 and electrically connected as by wire 32 with one end of the generator shunt coil 33 which has its opposite end connected with the wire 18. The wire 32 is connected with the wire 19 through a resistor 34, which is obviously "shunted out" when contact is made at 27—30, and which is in series with the field coil 33 when contact between 27—30 is broken. The member 35, of iron or other magnetic material, has the lower ends of its legs held in close proximity to or in contact with the foot of member 2 as by the flexible strip 36, while the upper end of 35 is separated from the pole piece 5 by an air gap as indicated at 37. And, therefore, 35 is really an armature for pole pieces 2 and 5 in shunt with the armature 7. Member 35 is cut away, as indicated at 38—39, so as to allow the leaf spring 40 to pass through the opening without touching the member 35 when the same is held in contact with its stops 41, as by means of spring 42 which may be adjusted as by bending member 43. 45 is a stop of non-magnetic material limiting movement of armature 35 toward pole piece 5, and 44 is a similar stop limiting the movement of armature 24 toward pole piece 2.

An operation of my invention is substantially as follows:

If the generator 17 be at rest, the parts of the structure of Figs. I and II will be in the positions shown in the drawing with the generator circuit broken at "points" 12—13, and the load 20 may be supplied by the battery 16.

If the generator now be started and its speed gradually increased, and assuming that the left brush be positive, current will flow through shunt coil 33, wire 32, screw 31, contact 30—27, reed 26, pole piece 4, core 3, member 2 and wire 19, back to the generator, a portion also flowing through the resistor 34, in an obvious manner.

Current will also flow from the generator through wire 22 and resistor 23 and coil 21 to member 2, and thence back to the generator through wire 19. This current will set up a magnetic flux in core 3 in the direction of the arrow thereupon, part of which will close the gap from member 2 to armature 7 and flow to pole piece 5 and thence into core 3. Part of this flux thus set up in core 3 will cross the gap from member 2 to armature 24 and pass through 24 and pole piece 4 to the core 3; and thus the lower ends of armatures 7 and 24 will both tend to move toward member 2. Part of this flux will also flow from member 2 to member 35 and thence from the upper end of 35 across the air gap 37 to the pole piece 5, and this will tend to draw the upper end of the member 35 (which is really an armature) toward pole piece 5.

I now hold the contact at 27—30 closed so as to insure full field current to the generator; and, when the generator voltage reaches the point that it is substantially equal to the normal battery voltage, I so adjust the spring 9 (as by bending the member 10) and the air gap between 7 and 2 (as by bending the stop 11) that the armature 7 will be drawn toward the member 2 and close the contact at 12—13, and thus connect the generator with the battery through the winding 14. I then increase the speed of the generator until the maximum current desired to have the generator deliver is flowing in winding 14 and then adjust the spring 42 (as by bending the stop 43) and the air gap 37 (as by bending the stops 41) that at this point the current in winding 14 will cause the upper end of armature 35 to approach the pole piece 5 and bring the portion 39 of the armature 35 into contact with spring 40, whereupon any further increase in current will materially weaken the effect of spring 40 which normally tends to hold the contact at 27—30 closed, and thus hold the desired current from being exceeded.

I then lower the generator speed until its voltage is slightly below that of the battery, whereupon a slight back discharge will flow through winding 14 in a reverse direction and tend to weaken the flux in the core 3 and allow the spring 9 to open the contact between 12—13 and disconnect the generator from the battery and prevent back discharge therefrom through the generator.

With these adjustments made, I then open the wire 15 and release the armature 24 and increase the generator speed, and so adjust the pull of spring 40 upon the armature 24 (as by bending the member 28) and so adjust the air gap between member 2 and armature 24 (as by screw 31) that, when the desired maximum open circuit voltage is reached by the generator, coil 21 will cause the armature 24 to approach the pole piece 2 and open the contact at 27—30 which will throw the resistance 34 in series with the generator field. This will cause the voltage to tend to fall below the desired maximum; but, upon a very slight drop, the contact at 27—30 will be re-established and the device will operate as a well-known type of vibrating voltage regulator holding the maximum desired voltage constant within very narrow limits throughout speed changes of the generator above that value necessary to generate the required voltage.

I now stop the generator and reconnect wire 15 and, if the above adjustments have been properly made, starting the generator again and raising its speed will cause it to be connected with the battery as soon as their voltages are substantially equal; whereupon it will charge the battery with increasing current as the speed increases until either the maximum desired current or the maximum desired voltage has been reached, depending upon the condition of charge of the battery, amount of load, etc. When either of these maximum values has been reached, it will be limited throughout speed changes substantially independently of the other for the reason that the current regulating elements do not materially interfere with the voltage regulating elements, except as desired, for the following reason:

Assuming the entire winding 14 be eliminated, it is obvious that with no other alteration in the system we have a plain vibrating voltage regulator of well-known general type capable of holding the voltage constant very accurately. If then we replace the portion of winding between the pole pieces 4 and 5 only, and wind it so as to assist coil 21 in setting up a flux in core 3 when the generator is delivering current, it will tend to increase the flux through armature 7 tending to hold the switch closed, and also increase the flux through armature 35 tending to move the same, but, being on the opposite side of member 4 with respect to winding 3, will decrease the effective flux through armature 24 tending to open the contact at 27—30 and thus raise the adjustment of the voltage regulation as the load increases. This being the case, this effect upon the voltage regulation can be decreased as much as desired by adding a proper number of turns to winding 14 between the pole pieces 2 and 4; and, when the proper number of turns in both positions is selected, there may be practically no interference, if desired, notwithstanding all series turns add some of their effects to hold the switch closed and to produce current regulation and, when traversed by reverse current, add some of their effects to cause the switch to open.

However, I usually prefer so to wind the winding 14 and arrange the other parts that, when winding 14 is carrying the maximum current desired to have the generator deliver, it will limit this value by moving armature 35 and so affecting spring 40 that the contacts 27—30 will be vibrated in such manner as to prevent this current value from being materially exceeded and, also, when the current in winding 14 is slightly below the value which causes the armature 35 to affect spring 40, winding 14 will slightly raise the voltage necessary across coil 21 above that at which coil 21 will be able to hold across the generator when no current is flowing in winding 14. Therefore, with this adjustment of the device, as the load increases toward the maximum the voltage will be slightly increased in a desirable manner until the maximum is reached; and, when the battery voltage increases to the value indicating a full charge and the charging current begins to fall, the voltage regulation will have its standard lowered and the charge will be terminated in a desired manner.

If desired to compensate for temperature changes in coil 21, it may be wound with a relatively coarse wire and have a resistor with zero or negative temperature coefficient in series, as shown at 23, as is now well known in the art,— or a strip of material the magnetic permeability of which varies inversely with its temperature, such as nickel steel, may be used as a magnetic shunt, as indicated in dotted lines at 46.

I often find it advantageous to so proportion the cross section of, at least, a part of armature 7 that this will become saturated as the desired maximum current in winding 14 is reached, so that further increase in flux through 3 and pole piece 5 will tend to flow in greater proportion through armature 35 to effect current regulation, and this may be readily brought about as shown in Fig. III.

Conversely, I may reduce the reluctance of armature 35 by forming the slot therein as shown at 54 in Fig. IV and by closing part of the lower opening as indicated in dotted lines in the said figure, this opening being shown as large in Fig. II so as to expose some of the parts which would otherwise be hidden behind the armature.

In that modification shown in Fig. V, the opening in armature 35, between 38 and 39, is so arranged that the armature will not touch the spring 40 during any movement, and the armature 35 is provided with a reed 47, insulated therefrom as indicated, which carries the contact "point" 48 normally held in contact with the "point" 49, carried by the member 50, which may be held in place by screw 6, but insulated from the rest of the structure, as indicated.

Therefore, if the structure of Fig. I be modified, as shown in Fig. V, and wire 32 connected with either wire 51 or 52 of Fig. V instead of with 31 as in Fig. I, and the remaining one of said wires 51 or 52 connected with screw 31 in the manner 32 is shown connected in Fig. I, the two sets of contact "points" will be placed in series and control the generator to limit the current and voltage to bring about substantially the same effects as pointed out above, as will be obvious to those skilled in the art, in view of the foregoing.

From the foregoing it will be plain that I have produced a combined automatic switch and regulator capable of connecting and disconnecting a generator and battery in the usual manner, and providing current and voltage regulation which may be substantially independent or interdependent in a direction and to a degree desired for the proper charging of a storage battery in the now preferred manner.

And, as the drawing forming part of this application, for sake of clearness, shows a structure of something more than twice the dimensions I have found necessary for use in modern automobile systems, it will be seen that it provides a small, simple, and inexpensive device for use in such systems which provides the same type of regulation and refinement as has been obtained in railway car installations where quite complicated and expensive systems have been employed.

It will, of course, be obvious that, in systems where large currents are employed, a small device as here indicated may be used by having the switch portion act as a relay for any suitable type of contactor and by having the vibrating contacts control any suitable kind of electrically controlled resistance device in the field of the generator, and that the structure here shown may control the field of an exciter which, in turn, may control the main dynamo,—which arrangements are now all commonly used and well known in the art.

Further, it will be obvious that where current output would, if carried entirely by the winding 14, require an inconveniently heavy conductor, part of the current may be carried by a shunt in the usual manner employed in such cases.

I do not here limit myself to any of the exact constructions shown nor to any of the particular modes of operation herein described, which have been set forth merely to illustrate one embodiment of my invention, which is as set forth in the following claims.

What I claim is:

1. In a combined automatic switch and regulator of the vibrating contact type, a voltage coil for closing the switch, means operated by said coil for vibrating the regulator contact, a current coil magnetically cooperating with the voltage coil to affect the switch, and movable means whereby the current coil by movement of said movable means mechanically affects the operation of the contact.

2. A combined automatic switch and regulator comprising a magnet core provided with pole pieces at its ends and an intermediate pole piece, a switch operating armature carrying flux between the end pole pieces, a current regulating armature carrying flux between the end pole pieces, and a voltage regulating armature carrying flux between the intermediate pole piece and an end pole piece.

3. A combined automatic switch and regulator comprising a magnet core provided with pole pieces at its ends and an intermediate pole piece, a switch operating armature carrying flux between the end pole pieces, a current regulating armature carrying flux between the end pole pieces, a voltage regulating armature carrying flux between the intermediate pole piece and an end pole piece, a current winding between an end pole piece and the intermediate pole piece, and a voltage winding between another end pole piece and the intermediate pole piece.

4. A combined automatic switch and regulator comprising a magnet core provided with pole pieces at its ends and an intermediate pole piece, a switch operating armature carrying flux between the end pole pieces, a current regulating armature carrying flux between the end pole pieces, a voltage regulating armature carrying flux between the intermediate pole piece and an end pole piece, a current winding between an end pole piece and the intermediate pole piece, a current winding, and a voltage winding between another end pole piece and the intermediate pole piece.

5. A combined automatic switch and generator regulator comprehending a switch, generator regulating means, magnetic circuits through which magnetic flux may operate the switch and the regulating means, a voltage coil setting up flux for closing the switch and operating the regulating means, current windings setting up flux tending to affect the regulating means and assisting in holding the switch closed when traversed by current in a given direction and causing the switch to open when traversed in the opposite direction, said voltage coil and current windings being so proportioned and arranged with respect to the magnetic circuits as to coact to hold the generator voltage substantially constant in spite of speed changes above a certain limit unless the current tend to increase above a predetermined limit, and means whereby in this event the current windings abruptly affect the regulator to prevent this limit from being materially exceeded.

6. A combined automatic switch and generator regulator including switch mechanism, generator regulating means, a voltage coil, a current winding, means whereby said coil and winding coact to operate the switch mechanism, means whereby said coil and winding coact to affect the regulating means to produce voltage regulation, and means whereby said coil and winding coact to affect the regulating means to produce current regulation.

7. A combined automatic switch and generator regulator including switch mechanism, generator regulating means, a voltage coil, a current winding, means whereby said coil and winding coact to operate the switch mechanism, means whereby said coil and winding coact to affect the regulating means to produce substantially independent voltage regulation, and means whereby said coil and winding coact to affect the regulating means to produce substantially independent current regulation.

8. A combined automatic switch and generator regulator including switch mechanism, generator regulating means, a voltage coil, a current winding, means whereby said coil and winding coact to operate the switch mechanism, means whereby said coil and winding coact to affect the regulating means to hold the generator voltage substantially constant, and means whereby said coil and winding coact to affect the regulating means to hold the generator current substantially constant.

9. A combined automatic switch and generator regulator including switch mechanism, generator regulating means, a voltage coil, a current winding, means whereby said coil and winding coact to operate the switch mechanism, means whereby said coil and winding coact to operate the regulating means to regulate the generator to hold its voltage from exceeding a predetermined limit substantially independently of current delivered by the generator while said current remains below a certain value, and means whereby said coil and said winding affect the regulating means to prevent this value from being exceeded substantially independently of voltage changes so long as the voltage remains below the said predetermined limit.

10. A combined automatic switch and generator regulator including regulating means, a voltage coil, means whereby said coil may alone close the switch and operate the regulating means to hold a generator voltage substantially constant throughout speed changes, current windings coacting with the voltage coil to operate the switch and to maintain the voltage regulation substantially as when the voltage coil alone is operative until a given current value is reached, and means whereby said current windings prevent this value from being materially exceeded.

11. A combined automatic switch and generator regulator for use in a system employing a variable speed generator and a battery to be charged thereby, including switch mechanism for connecting and disconnecting the generator and battery, means for regulating the generator, a voltage responsive coil for closing the switch mechanism and for operating the regulating means to control the generator voltage as against speed changes of the generator, a current coil coacting with the voltage coil in the operation of the switch mechanism, means whereby said current coil affects the regulating means to prevent the generator current from materially exceeding a predetermined limit, and means for preventing current in said coil from materially affecting the regulation performed by the voltage coil until the current value reaches said limit.

12. A combined automatic switch and generator regulator for use in a system employing a variable speed generator and a battery to be charged thereby, including switch mechanism for connecting and disconnecting the generator and battery, means for regulating the generator, a voltage responsive coil for closing the switch mechanism and for operating the regulating means to control the generator voltage as against speed changes of the generator, a current coil coacting with the voltage coil in the operation of the switch mechanism, means whereby said current coil affects the regulating means to prevent the generator current from materially exceeding a predetermined limit, and means for controlling the standard of voltage held by the voltage coil throughout changes in current below said limit.

13. In a combined automatic electric switch and generator regulator of the type wherein the switch is adapted to connect a generator with a storage battery to allow charging thereof and to disconnect the generator from the battery to prevent back discharge through the generator and wherein the regulator controls the generator for substantially independent voltage and current regulation throughout speed changes of the generator; switch mechanism, generator regulating mechanism, a current coil, a voltage coil, means whereby said coils coact to operate the switch mechanism and also coact to operate the regulating mechanism.

14. In a combined automatic electric switch and generator regulator of the type wherein the switch is adapted to connect a generator with a storage battery to allow charging thereof and to disconnect the generator from the battery to prevent back discharge through the generator and wherein the regulator controls the generator for substantially independent voltage and current regulation throughout speed changes of the generator; switch mechanism, generator regulating mechanism, a current coil, a voltage coil, means whereby said coils coact to operate the switch mechanism, and means whereby said coils also coact to operate the regulating mechanism.

15. The combination with a variable speed generator and a storage battery to be charged thereby, of switch mechanism for connecting and disconnecting the generator and battery, regulating mechanism for controlling the generator, a coil responsive to generator voltage for controlling the regulating mechanism, a current responsive coil coacting with the voltage coil in affecting the switch mechanism and tending to affect voltage regulation produced by the voltage coil, means controlling the effect of current in said current coil upon said voltage regulation, while said current is below a certain value, and means operated in response to current in said current coil acting when said certain value is reached to affect the regulating mechanism to usurp the regulation and prevent said current value from being materially exceeded.

16. In a system of the type having a generator driven at variable speed and a storage battery charged thereby, a combined automatic switch and generator regulator including switch mechanism for connecting and disconnecting the generator and battery, regulating means for controlling the generator throughout speed changes, a voltage responsive coil affected by the generator voltage, a current responsive winding affected by generator current, means whereby said coil and said winding coact to operate the switch mechanism, means whereby said coil and said winding coact to operate the regulating means to hold the generator voltage substantially constant in spite of speed changes so long as the voltage value thus held causes the generator current to remain below a certain value, and means whereby said coil and winding coact when the said current value is reached to operate the regulating means to prevent this value from being materially exceeded throughout changes in speed of the generator.

JOHN L. CREVELING.